Oct. 1, 1957 — T. M. BARNES ET AL — 2,807,996
TYING MECHANISM CONTROL FOR BALERS
Filed July 26, 1955 — 3 Sheets-Sheet 1

INVENTORS
T. M. BARNES
A. B. SKROMME

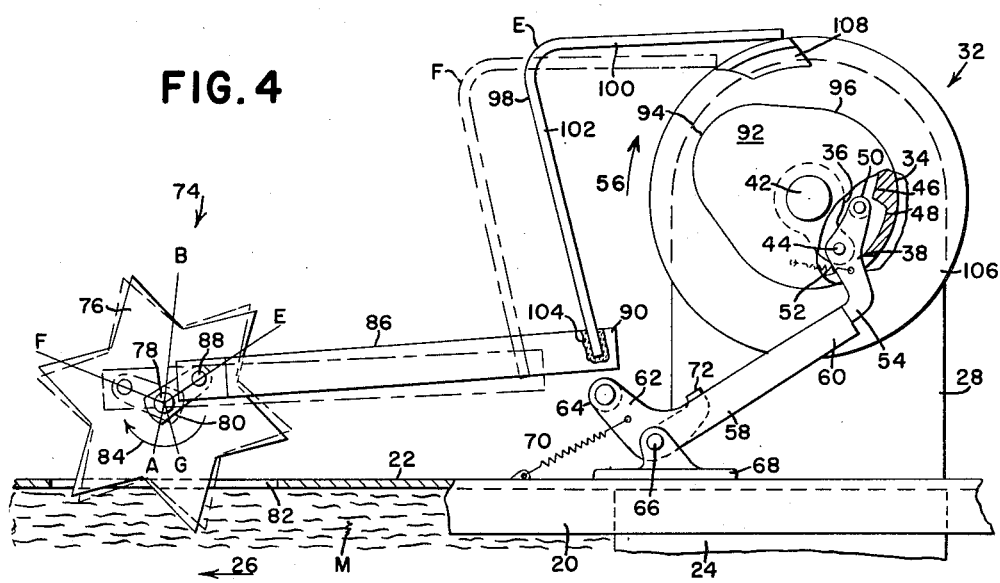
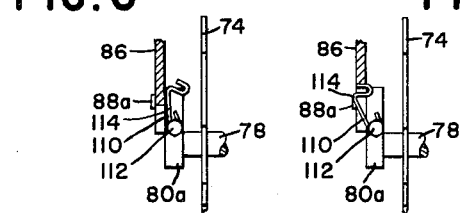
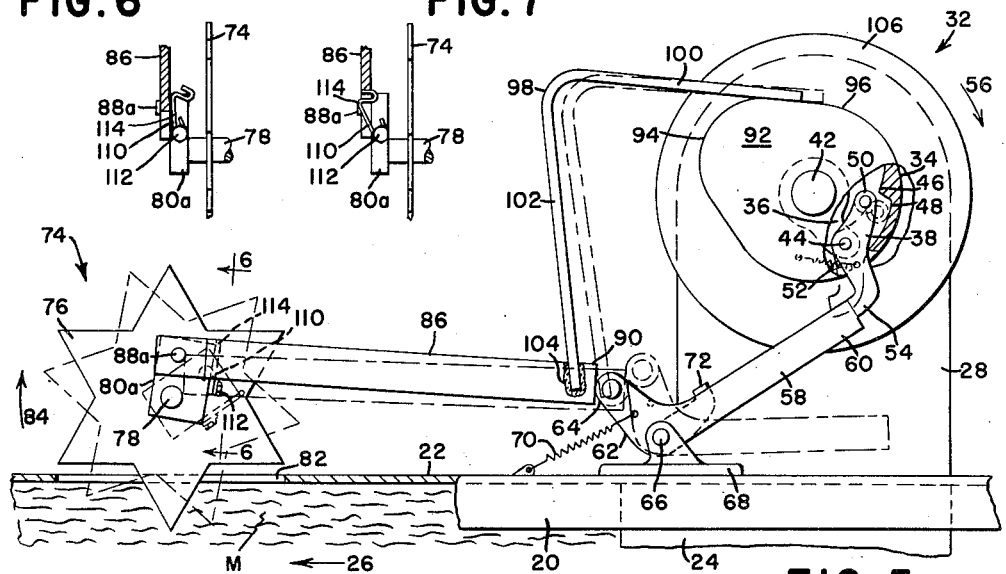
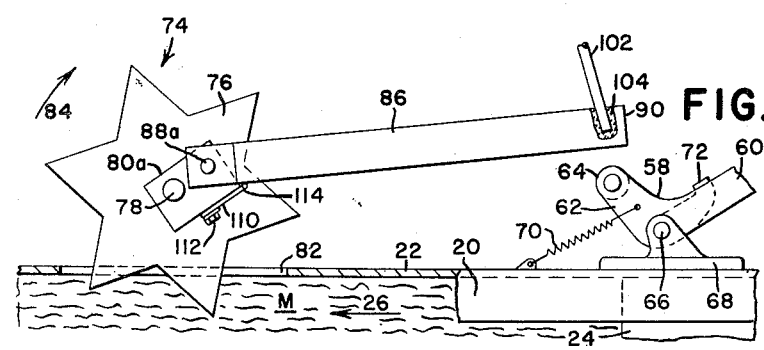
INVENTORS
T. M. BARNES
A. B. SKROMME

Oct. 1, 1957  T. M. BARNES ET AL  2,807,996
TYING MECHANISM CONTROL FOR BALERS
Filed July 26, 1955  3 Sheets-Sheet 3
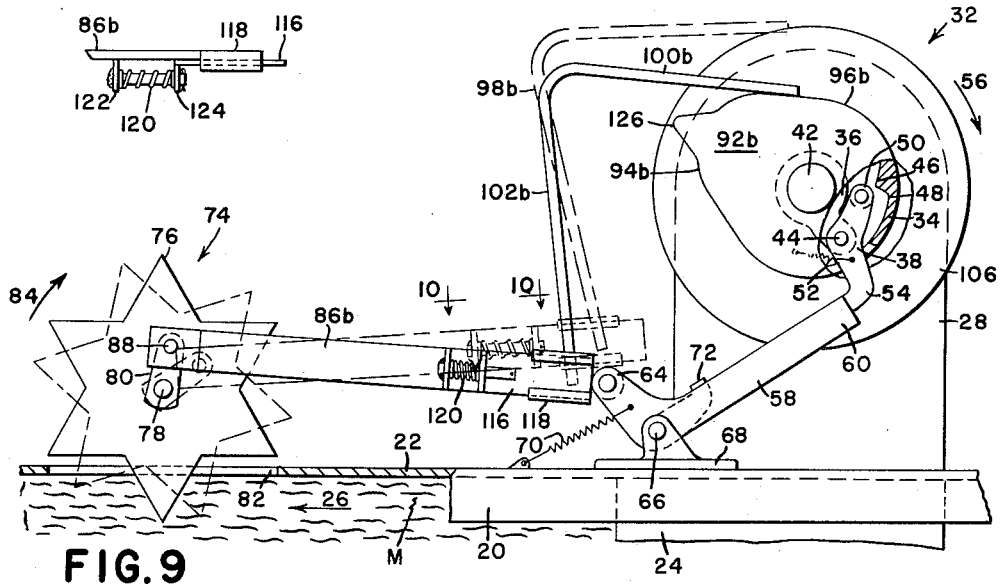
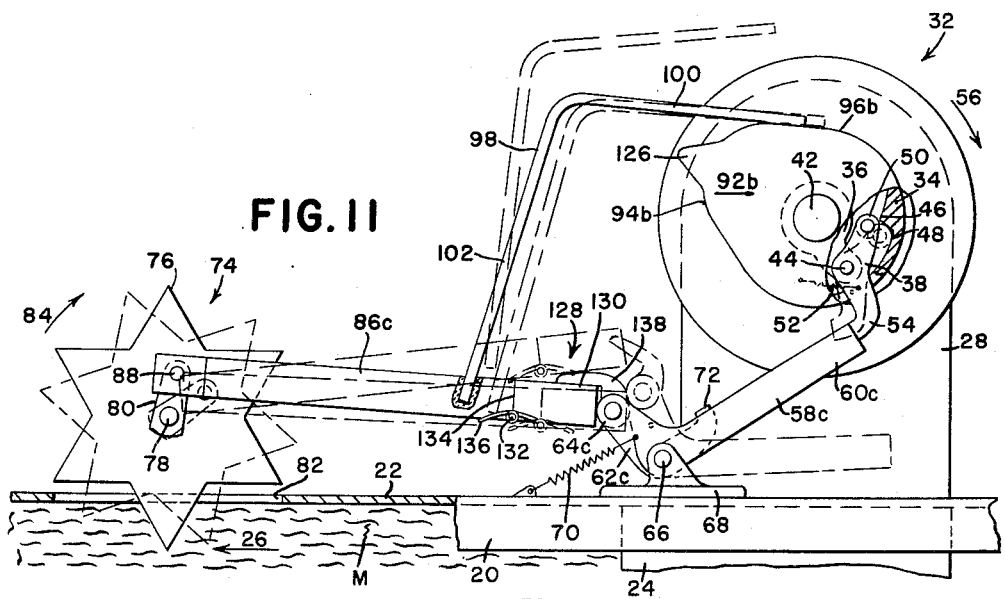
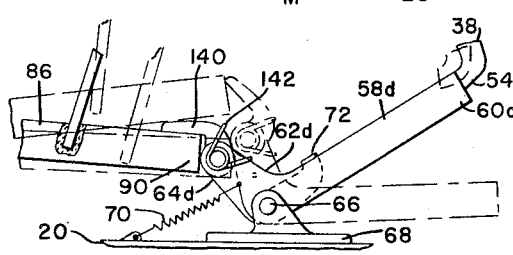
INVENTORS
T. M. BARNES
A. B. SKROMME United States Patent Office
2,807,996
Patented Oct. 1, 1957

2,807,996

TYING MECHANISM CONTROL FOR BALERS

Theodore M. Barnes and Arnold B. Skromme, Ottumwa, Iowa, assignors to Deere Manufacturing Co., Dubuque, Iowa, a corporation of Iowa Application July 26, 1955, Serial No. 524,514

11 Claims. (Cl. 100—4)

This invention relates to a baler of the type having automatic tying mechanism operated in response to a measuring device that reflects the size of a bale formed by material fed to a bale-forming chamber or case.

A typical baler of the general character referred to is normally mobile, so that it may operate over a field of windrowed crops, such as hay, these crops being fed to bale-forming means in the form of a reciprocating plunger that compacts and accumulates the material in a bale case, which bales are successively tied by periodically operative tying mechanism. It is conventional to use some form of measuring device, such as a star wheel or the like, for setting into operation a tying mechanism that is idle during the accumulation of material. When the accumulated material reaches a predetermined size, ordinarily determined on the basis of length as the material moves through the bale case, the measuring wheel trips a tier clutch which energizes the tying mechanism.

One of the principal difficulties experienced in the practical use of a mechanism of the character referred to involves what is known as double or multiple tripping. That is to say, the tying mechanism should be tripped once for each bale and each bale should theoretically be of the same length. However, when multiple tripping occurs, it is because the timed relationship between the tying mechanism and the measuring device is seriously affected by either malfunctioning or premature functioning of the tripping means. Very often, two or more knots will be tied in succession, resulting in damage to the tier, or certain bales will be only a fragment of the length that they should be. According to the present invention, multiple tripping is eliminated, which is traceable to a design in which means is provided for rendering the tripping mechanism inoperatve until the measuring device has moved through a predetermined phase consistent with the elimination of prematurely short bales. It has been found by practical experience that as long as rotation of the measuring wheel depends upon the accumulation and movement of material, the measuring device must engage the material. Since the material is somewhat resilient, it is subject to expansion in a retrograde direction when compression pressures on the material are released. Consequently, the measuring wheel may have counter-rotation. If such counter-rotation occurs directly after proper operation of the tying mechanism, the tripping mechanism is likely to be prematurely re-energized. According to the present invention, this difficulty is eliminated primarily by the provision of means for causing the tripping mechanism to occupy what may be considered an inoperative status for a predetermined period following each tying operation. The means for accomplishing this result may assume several forms, many of which are disclosed here. The invention further features the provision of preferred embodiments of this invention that may be readily incorporated into tying mechanisms of existing design.

The foregoing and other important objects and desirable features inherent in and encompassed by the invention will become apparent as preferred embodiments of the invention are disclosed in detail in the ensuing specification and accompanying drawings, the several figures of which are described immediately below.

Fig. 4 illustrates further positions of the mechanism of Figs. 1, 2 and 3.

Fig. 5 illustrates two different positions of a structure involving a modified form of the invention.

Fig. 6 is a fragmentary sectional view as seen along the line 6—6 of Fig. 5.

Fig. 7 is a similar sectional view but showing a different relationship between the parts.

Fig. 8 is a changed-position view of a fragment of the structure of Figs. 5, 6 and 7.

Fig. 9 illustrates a further modification of the invention.

Fig. 10 is a fragmentary view as seen along the line 10—10 of Fig. 9, with reference to the dot-dash position of the parts.

Fig. 11 is a multiple-position view of a still further modified form of the invention.

Fig. 12 is a fragmentary view of a further modified form of the invention.

Figs. 1 to 4

Figure 1:
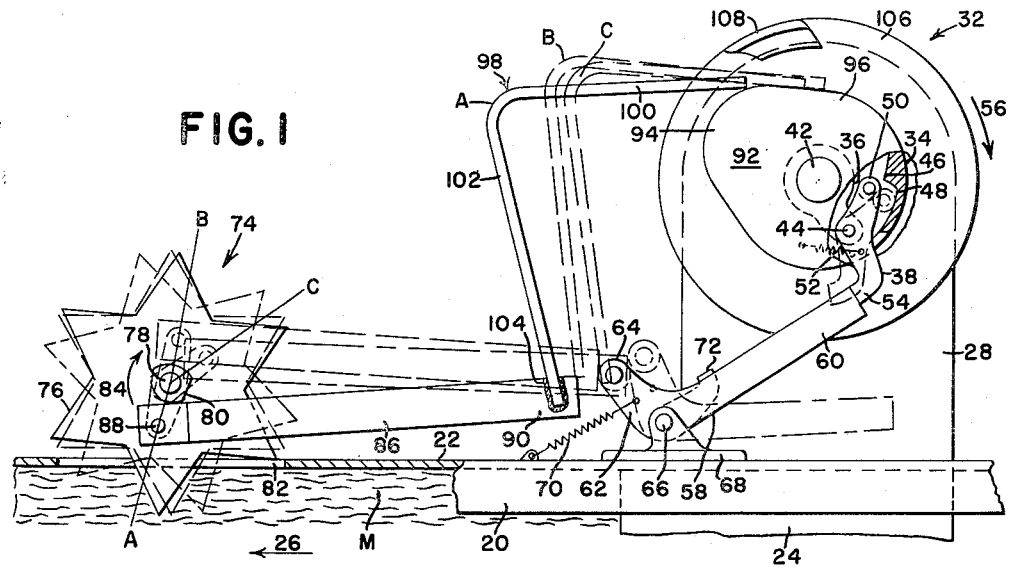
Fig. 1 is a fragmentary elevational view, partly in section, illustrating one form of the invention and showing in broken lines different positions of the operative components.

The overall aspects of the structure illustrated in these figures are such as to enable one to readily recognize typical baler structure in which the numeral 20 represents a bale case or chamber having an upper wall 22 and within which bale-forming means such as a plunger 24 operates to feed material M in the direction of the arrow 26 so that the material is accumulated, compacted and moved lengthwise of the bale case or chamber for ultimate tying into individual bales. In cases in which the bale-forming means comprises a plunger, such as the plunger 24 here, the material will be fed in successive increments or charges as the plunger operates on alternate compression and retraction strokes. The sizes of the charges will depend in the first instance on the amount of material fed into the bale case from the usual pick-up means (not shown here). As is well known, these charges will vary according to the size of the windrow being picked up. Consequently, although most balers are theoretically automatic in operation, perfection cannot always be obtained because of such variations as those already noted.

In a typical operating cycle, the material M is accumulated into a bale of predetermined length and this bale is tied in any suitable manner by appropriate tying mechanism, such as indicated here by the numeral 28. The tying medium may be either wire or twine, one strand of which is wrapped around the material as it accumulates and the other strand of which may be fed to the tying mechanism as by one or more tying needles, one of which is illustrated generally at 30 in Fig. 3. The arrangement is such that during the formation of bales the tying mechanism is de-energized and the needle is outside of the bale case, but, when the tying mechanism is energized, the needle moves across the bale case and behind the just completed bale to carry the strand into association with means (not shown) within the tying mechanism, whereupon an appropriate knot or tie is formed. Conventionally, the tying operation takes place as the plunger retracts and should be completed in time to enable withdrawal of the needles from the bale case before the plunger finishes its next compression stroke.

Since the tying mechanism must be idle until the bale has attained its proper length, it is conventionally under control of a clutch, illustrated here as one-revolution clutch 32 that includes a constantly rotating driving part 34, an intermittently rotating part 36 and a control member in the form of a trip dog 38. Input to the clutch is shown as being established by a drive chain 40. The constantly rotating portions of the clutch are journaled on a tier shaft 42 to which the intermittently rotating part 36 is keyed by any suitable means. The dog 38 is pivoted at 44 to the driven or intermittently rotating part 36 in eccentric relationship to the axis of the shaft 42. Pivoting of the dog establishes the ability thereof to swing between a biased position of engagement with the driving part 34 or a releasably retained disengaged position relative to the driving part. In a typical one-revolution clutch, of which the present disclosure is representative, the driving part 34 has a lug or hump, as at 46, to afford a notch at 48 for receiving a roller 50 on the dog 38 as the dog is biased by a spring 52 to its position of engagement with the lug 46. It will thus be seen that if the dog 38 is left entirely to the control of the biasing means 52, a status of engagement will be established and the two clutch parts 34 and 36 will rotate as one. Hence, as the clutch 32 rotates, the pivot 44 serves as a connection between the dog 38 and the driven part 36 and the free or projecting end of the dog 38, as at 54, travels through a circular path. If some obstacle is interposed in the path of the dog, the dog will pivot at 44 against the load on the spring 52 to the full-line position of Fig. 1. In other words, the direction of rotation of the clutch is indicated by the arrow 56 and any obstacle imposed in the path of the clutch dog 38 will interrupt the engagement of the clutch by forcing the dog in a direction counter to the direction of rotation. In clutches of the type described, there is little or no coasting and it is expected that disengagement of the clutch will be substantially instantaneous.

It is not unknown in balers and in other mechanisms depending for part of their operation upon a one-revolution clutch, or a similar clutch, to utilize an operator or trip arm, here in the form of a bell crank 58, for effecting the interruption of the clutch by presenting the trip arm as a releasable obstacle to the free end 54 of the dog 38. The bell crank shown here has a first arm 60 and a second arm 62 on which is a roller 64. The bell crank is pivoted intermediate its arms at 66 on a suitable bearing 68 mounted on the bale case 20. Biasing means in the form of a tension spring 70, connected between the bale case and the bell crank arm 62, normally holds the bell crank or operator in what may be termed a dog-retaining position (full lines, Fig. 1; Fig. 4). This position is determined by a stop 72 fixed to the bearing 68.

Tripping of the clutch 32, so as to effect interengagement of the driving and driven parts 34 and 36, is accomplished simply by means for removing the arm 60 of the bell crank 58 as an obstacle to the spring-loaded tendency of the dog 38 to move to its position of engagement in the notch 48 of the driving part 34. This is conventionally accomplished by means operative in response to a measuring device, such as designated here generally by the numeral 74. This device comprises a star wheel or other toothed rotatable member 76, suitably supported by the top wall 22 of the bale case and driving a transverse measuring wheel shaft 78 to the outer end of which is rigidly fixed a crank arm 80. The top bale case wall 22 is suitably slotted at 82 to enable the teeth of the star wheel to engage the accumulating material M. Hence, as the material moves in the direction of the arrow 26, the star wheel will rotate through a normal cycle in the direction of the arrow 84.

An actuator in the form of a trip link 86 is connected at one end to the free end of the measuring wheel crank arm 80 by means of a crank pin 88 and has its other end 90 proximate to the operator or bell crank 58. The general theory of operation is that, as the measuring wheel 76 rotates in response to the accumulation and movement of the material M, the end 90 of the actuator or trip link 86 progressively recedes from and then approaches the roller 64 on the bell crank 58. The recession and approach of the actuator are along a fairly well defined path until the end 90 contacts the roller 64 of the bell crank. In the final phase of angular movement, or at the termination of the cycle of the measuring wheel, the actuator 86 shifts in its approach direction so as to shift the operator or bell crank 58 to the dot-dash position of Fig. 1. As will be seen there, the arm 60 of the bell crank clears the end 54 of the dog 38 and the spring 52 causes the dog to swing so that the dog roller 50 is engaged in the notch 48 of the driving member 34 of the clutch. Unless the bell crank is permitted to return to its dog-retaining position by its biasing means 70, clutch engagement will continue. Therefore, some means must be provided for again interrupting the clutch. In the normal use of a clutch such as that illustrated, provision for interruption is made to become effective after each revolution. Such arrangement is illustrated here.

Keyed to the tier shaft 42 or otherwise integral with the intermittently rotating part 36 of the clutch 32 is a cam 92 which has high and low portions 94 and 96 respectively. When the clutch is idle, the angular relationship of the cam 92 to the rest of the structure is such that part of the low portion 96 of the cam serves as a support for a carrier 98, here in the form of an inverted L having a horizontal leg 100 and an upright leg 102. The lower end of the leg 102 is rigidly secured, as by welding at 104, to the operator-proximate end 90 of the actuator or trip link 86, and the weight of the link 86 and carrier 98 biases the link normally downwardly.

The full line positions of the parts in Fig. 1 represent what may be considered the starting position. A radial line A from the measuring wheel shaft 78 as a center and through the crank pin 88 indicates the starting position of the measuring wheel 76 and the letter A as applied to the lifter or guide 98 represents the starting position thereof. As will be seen, the tip of the horizontal leg 100 of the lifter is on the low part 96 of the cam 92 and the tier clutch is disengaged, because the arm 60 of the bell crank 58 is retaining the clutch dog 38 in its position of disengagement from the clutch driving part 34. As the material M accumulates in the direction of the arrow 26, the measuring wheel 76 rotates in the direction of the arrow 84, causing the end 90 of the trip link or actuator 86 to recede. The actuator remains supported on the low portion of the cam 92 during this phase of operation. Of course, the tier clutch 32 remains disengaged. As the measuring wheel reaches the dash-dash position, represented by travel of the wheel from the radial A to the radial B, the end 90 is in that part of its path in which it approaches the roller 64 on the operator or bell crank 58. The leg 100 of the lifter 98 merely slides along the top of the cam 92 and the actuator is guided along its approach path and into contact with the operator roller 64, the corresponding position of the lifter being identified by the letter B. As the measuring wheel continues to rotate, as from the radial B to the radial C, the end 90, already in contact with the roller 64, moves to its dot-dash position and shifts the bell crank to its dot-dash position, thus clearing the end 60 from the clutch dog 38 and allowing the clutch dog to swing into its engaged position under action of the spring 52, as indicated by broken lines.

The engaged clutch now establishes rotation in unison of the driving and driven parts and as the driven part begins to rotate, the cam 92, driven thereby, presents its high portion 94 to the end of the lifter leg 100. Since the acceleration is substantially instantaneous, the lifter is moved rapidly upwardly so that the actuator 86 is displaced from its approach-recession path; and, as the high portion 94 of the cam passes the end of the lifter leg 100, the weight of the actuator and lifter causes them to descend. However, in the meantime, the now cleared bell crank 58 is returned by its spring 70 to its original position (Fig. 3) and the roller drops behind (to the left of) the end 90 of the link 86, thus creating a condition of operator-actuator misalinement lengthwise of the approach-recession path. As the clutch operates, the end 54 of the dog 38 is projected radially and, upon the completion of substantially one revolution, the dog 38 is engaged by the arm 60 of the bell crank 58 and is thus forced out of engagement with the driving part 34 (Fig. 4), again de-energizing the tying means.

Figure 3:
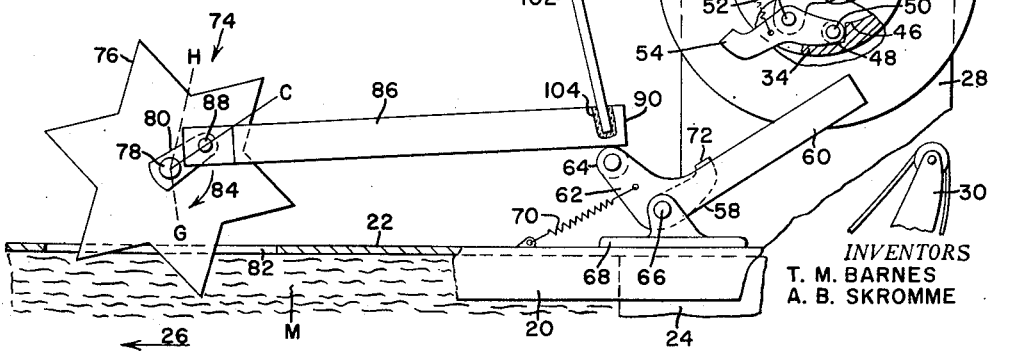
Fig. 3 is a view similar to Fig. 1 but illustrating a different position.

If the only control for the establishment of the Fig. 3 position of the actuator 86 resides in the lifting cam 92, which serves the dual function of supporting means via the low portion 96 (Fig. 1) and actuator-displacing means via the low portion 94 (Fig. 3), then after the clutch 32 is tripped the actuator 86 would drop to a position in which the end 90 thereof is supported on the roller 64 of the operator or bell crank 58, as in Fig. 3. Stated otherwise, the operator presents an obstacle to the return of the actuator 86 to its approach-recession path which obstacle would be immediately overcome as the actuator 86 is reset or returned to its starting position (A, Fig. 1) as it recedes upon rotation of the measuring wheel 76 through a relatively small angular increment in its next cycle in accompaniment to the formation of a new bale. Such second-cycle movement of the measuring wheel would cause the actuator 86 to recede from its Fig. 3 position and the end 90 thereof would drop off of the bell crank roller 64 so that the tip of the lifter leg 100 would again be supported on the low portion 96 of the cam 92 as in the starting position previously described. This is the normal operation without the improvements added by the present invention. As will appear below, recession of the actuator is in an amount sufficient to clear the obstacle or to remove the misalinement between the end 90 and the roller 64 and tripping of the clutch could occur upon reverse rotation of the measuring wheel, as from C to H in Fig. 3.

In order that multiple tripping can be eliminated, the structure of Figs. 1 through 4 includes means additional to the operator-presented obstacle for supporting the displaced actuator even after the condition of misalinement of the actuator and the operator is removed, which additional means functions to further postpone return of the actuator to its starting position. Stated simply, without the present invention the actuator will return to its starting position after a predetermined amount of angular movement of the measuring wheel 76. The present invention requires that the measuring wheel move through an additional angular range beyond that just mentioned. This is accomplished in Figs. 1 through 4 in a manner to be described below.

Integral with or otherwise driven by the intermittently rotating driven member 36 is a circular plate 106 which carries the additional means, which means in this form of the invention is what may be termed a second cam 108. This cam or lug is angularly offset in the direction of rotation of the arrow 56 from the high portion 94 of the first cam 92. As a practical matter, the lug 108 can be added as a cam to control mechanisms of existing design. The function of the lug may be best understood by a redescription of the operation of the control means.

As already described, the measuring wheel 76 rotates in response to the accumulation and movement of material M through the bale case, the direction of rotation being indicated by the arrow 84 as the measuring wheel travels from radial A to radial C (Fig. 1). After the clutch is tripped (Fig. 3) and the actuator 86 is displaced by the cam 92 so as to return to and rest upon the bell crank roller 64, the clutch continues in engagement for one revolution until the dog end 54 is again restrained or engaged by the bell crank arm 60. However, considerably prior to interruption of the clutch, the lug 108, serving as a cam, engages the end of the lifter leg 100 and interposes itself as an additional obstacle. Stated otherwise, retention of the actuator 86 in its displaced position now depends upon the lug 108 and not upon the operator 58. This position is clearly illustrated in Fig. 4. The advantage of the additional support afforded by the lug 108 may be appreciated by considering that the radial C in Fig. 3 represents control of the displaced position of the actuator 86 merely by the bell crank roller 64. After the bale has been tied, the plunger, reciprocating continuously the while, adds another charge of hay. Theoretically, this charge of hay should turn the measuring wheel in the direction of the arrow 84 through a certain angular increment, starting at C, Fig. 3 (E, Fig. 4) and successive increments added by successive compression strokes of the plunger would move the measuring wheel crank arm 80 around approximately to the position of the radial G, which would be coincident with the time that the actuator end 90 drops off the roller 64 prior to attaining its starting position. If now a particular charge of material added is of sufficient resiliency as to escape the usual hay dogs provided, this charge would expand in a retrograde direction (opposite to the arrow 26) as the plunger retracts. Since the measuring wheel 76 is in engagement with the material, retrograde movement of the material would result in counter-rotation of the measuring wheel 76. If the end 90 of the actuator 86 is in contact with the roller 64 at this time, reverse or counter-rotation of the measuring wheel would result in tripping of the clutch 32. If this should occur upon the addition of one or two charges of hay, an extremely short bale would be tied. If the entire bale should for some reason expand when the plunger retracts, just after tripping of the clutch 32, resulting in retrograde movement of the bale and concomitant counter-rotation of the measuring wheel 76 from the position indicated by the radial C to the position indicated by the radial H (Fig. 3), followed by tying of the bale and subsequent movement of the bale in a direction of the arrow 26 without the introduction of more material, the tying mechanism would again be tripped and would tie a second knot in the tying medium already wrapped around the bale. It is not unknown for a windrow to be so sparse in spots that the plunger at times operates without introducing any more hay. As will be readily apparent, alternate expansion and compression of a bale already tied could occur and reoccur, accompanied by multiple tripping of the tier clutch.

Fig. 4 best illustrates the improvement afforded by the present invention, because it will there be seen that counter-rotation of the measuring wheel 76 can occur to an extent represented by the angular range between radials E and F. With the measuring wheel and actuator in the F position, it will be seen that the end 90 thereof is quite clear of the bell crank roller 64. Yet, the lug 108 will keep the actuator in its displaced position. Therefore, counter-rotation of the measuring wheel, followed by correct rotation thereof, will merely idle the actuator 86, since the end 90 of the actuator, being clear of the operator 64, cannot retrip the clutch. In Fig. 4, the radial E is substantially in the same place as the radial C of Fig. 1 and the radial B corresponds substantially with the radial H of Fig. 3. Therefore, the improvement is represented by the angular range between radials B and F in Fig. 4. In other words, without the lug 108, multiple tripping would occur if angular movement of the measuring wheel 74 in a counter-direction is in the range of C to H in Fig. 3 or E to B in Fig. 4. But, with the lug 108, this angular range is increased by B to F in Fig. 4.

Substantially the same advantages are incurred in extending the required range of the measuring wheel in its correct direction. For example, it has already been said that without the lug 108 the actuator 86 would return to its normal position upon correct rotation of the measuring wheel 76 through the range C to G of Fig. 3. With the lug 108, this range is increased by the addition of G to A (Fig. 4).

Figure 2:
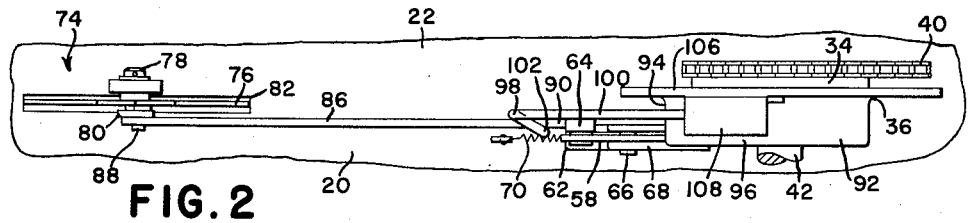
Fig. 2 is a plan view of the structure of Fig. 1.

As the mechanism proceeds through the various phases of Figs. 1 through 4 and back to Fig. 1 again, the actuator 86 first recedes from and then approaches and shifts the operator 58. The high portion 94 of the cam 92 lifts the actuator 86 to the position of Fig. 3. As the lug 108 returns to the starting position of Fig. 1, it engages the lifter leg 100 and raises the actuator to the position of Fig. 4. In normal operation, correct rotation of the measuring wheel will be from E to A in Fig. 4 and, as will be seen, the leg 100 rides to the left on the lug 108 until it drops off and is supported by the low portion 96 of the clutch cam 92 (A, Fig. 1). Now, as the measuring wheel 74 continues to rotate in the direction of the arrow 84 to proceed from A around to C, the leg 100 is simply slidably supported by the cam portion 96. In other words, when the actuator 86 recedes to allow the lifter leg 100 to drop off the lug 108, the lifter leg is slidably supported by the cam portion 96 in a position below the lug 108.

Figs. 5 to 8

Since there is substantial identity between the basic structure shown here and that previously described, the same respective reference characters will be used. These will be applied in the drawing without specific description thereof, except as mentioned in connection with the structural and operational relationship thereof to the modified form of delaying means. However, additional reference characters will be used where differences exist.

In this form of the invention, the lug 108 as previously described is not used. Instead, the connection of the actuator 86 to the measuring wheel is modified. To this end, then, the measuring wheel shaft 78 has rigidly secured thereto a crank arm 80a which is connected to the proximate end of the actuator 86 by a crank pin 88a. As shown in Fig. 5 in full lines, the end 90 of the actuator 86 is in its operator-contacting position. The broken lines illustrate the further shift of the actuator to cause the bell crank or operator 58 to shift to its dog-releasing position. Again, rotation of the clutch involves lifting of the actuator 86 via the cam 92 and lifter 98. The lifted position of the actuator 86 is shown in Fig. 8, and this lifted or displaced position is maintained by means cooperative between the actuator and the measuring device. For this purpose, the arm 80a on the measuring wheel shaft 78 has pawl means cooperative to keep the actuator 86 in its displaced position. In the form of the invention illustrated, the pawl comprises a torsion spring member 110 secured to the front of the arm 80a as by a cap screw 112. The bias in the spring 110 is such as to move its longer leg 114 outwardly against the actuator 86. When the arm 80a and actuator 86 are in the position of Fig. 5, the leg of the spring is confined behind the actuator. However, as the measuring wheel continues to rotate, the angle between the arm 80a and the actuator 86 is increased until finally the spring leg 114 escapes below the actuator and forms a one-way stop as best shown in Figs. 7 and 8. Consequently, the measuring wheel 76 may have counter-rotation without double tripping, since the means established by the pawl or spring 110 affords additional means delaying return of the actuator 86 to its approach-recession path. Stated otherwise, the means just described relieves the bell crank 58 of the support of the actuator and it therefore requires additional angular movement of the measuring wheel to clear the end 90 of the actuator 86 from the bell crank roller 64. Upon restoration of proper operation, the measuring wheel 76 rotates in the direction of the arrow 84 and the position of Fig. 8 is changed again to that shown in full lines in Fig. 5. Because of the shape of the spring 110, the actuator is adapted to wipe over it and to recock it for shifting to the position of Fig. 7. The similarity of the results obtained will be apparent by comparison with the description of Figs. 1 through 4 and it is deemed that additional details need not be elaborated.

Figs. 9 and 10

Again, the basic structure here is the same as that previously described and accordingly the same reference characters will be used except where distinctive differences appear.

This modification of the invention, like that in Figs. 5 through 8, does not depend upon the addition of the lug 108. Instead, an actuator 86b is equipped with an extensible and retractible extension 116 which is guided by guides 118 for movement lengthwise of the actuator. A relatively light spring, lighter than the spring 70 on the operator 58, urges the extension 116 to its extended position (Fig. 10). A suitable spring is shown at 120 as operating between a lug 122 fixed to the actuator and a lug 124 fixed to the extension. As the actuator approaches the bell crank roller 64, the end of the extension 116 engages the roller. Further rotation of the measuring wheel 76 in the direction of the arrow 84 causes the extension to collapse or retract, since the spring 70 on the operator 58 is stronger than the spring 120. However, when the spring 120 becomes solid, or sufficiently so, the actuator 86b becomes in effect a one piece member operative to shift the operator 58 to its dog-releasing position (which will correspond with the broken line position of the operator in Fig. 1). Thereupon, the clutch is engaged and the cam 92b, having high and low portions 94b and 96b, rotates with the driven member to lift the actuator 86b by means of a lifter 98b. This lifter has legs 100b and 102b, the latter being rigidly secured to the guides 118. In view of the spring loading at 120, it is possible that the extension 116 will interfere with the immediate return of the operator 58 to its dog-retaining position. Accordingly, the cam 92b is provided with a high lift portion 126 to assure that the actuator extension clears the operator so as to permit the operator to return to its dog-retaining position. As the actuator 86b clears the operator, the spring 120 causes the extension to project or extend and it thereupon serves as means for supporting the actuator on the operator. The length of the extension determines the range of permissible angular movement of the measuring wheel 76 before the extension clears the operator. As the measuring wheel rotates and the extension 116 drops off of the operator, the actuator 86b returns to its normal phase and further rotation of the measuring wheel repeats the operation previously described.

Figure 11

Here again, identity between corresponding parts will be observed by the use of corresponding reference characters, except where distinctive differences occur. The clutch is similar to that in Fig. 10 and has the high-lift portion 126. The actuator is designated by the character 86c and again is driven by the measuring device 74 in the manner previously described for the other actuators. The actuator 86c includes a collapsible means 128, comprising an extension member 130 pivoted to the basic actuator 86c as by a pivot 132. The parts 86c and 130 abut along the line 134 and this abutment provides stop means for limiting pivoting of the parts to a range away from and back to that illustrated, under action of a torsion spring 136. An operator 58c has arms 60c and 62c as well as a roller 64c and is further augmented by a rigid extension 138 that projects therefrom in the direction of recession of the actuator 86c.

In operation, the measuring wheel 76 rotates in the direction of the arrow 84 until the actuator 86c approaches the operator 58c as illustrated in full lines in Fig. 11. Upon further rotation to the dot-dash position, the approach of the actuator 86c is increased so that the operator 58c is shifted to its dot-dash position, thus releasing the clutch dog 38 for establishing engagement of the clutch 32. As the clutch parts rotate in unison, the high lift portion 126 on the cam 92b engages the leg 100 of the lifter 98, lifting the actuator to the dash-dash position. Displacement or lifting of the actuator 86c is made possible by the collapse or buckling of the actuator portion 130, which engages under the operator extension 138. However, as the actuator clears the operator, the operator returns to its dog-retaining position and the extension 138 affords a further obstacle to clearing of the operator by the actuator until a certain degree of rotation of the measuring wheel 76 occurs. Again the principles of the previously described embodiments of the invention are present.

*Figure 12*

In this form of the invention, the operator is shown at 58d, having legs 60d and 62d, a roller 64d and being pivoted at 66 to the previously described bracket 68. The actuator is shown at 86, since it may be substantially identical to that shown in Figs. 1 through 4. In this form of the invention, the operator 58d carries thereon a movable extension 140, which is distinguished from the extension 138 in Fig. 11, which is rigid. In Fig. 12, the extension 140 is spring loaded by a torsion spring 142 to the full line position as illustrated. The offsetting of the extension 140 relative to the line of approach of the actuator 86 is such that the end 90 of the actuator passes beneath the extension 140 and, as the measuring wheel rotates in the final phase of its cycle, the operator 58d is displaced to the full line position. Simultaneously, the lift cam, such as at 94 in Figs. 1 through 4, lifts the actuator to the dotted line position. As the actuator 86 is lifted or displaced, it forces the extension 140 against the yielding means afforded by the spring 142. Displacement of the actuator is high enough to allow the extension to snap back into place before the operator 58d returns to its dog-retaining position. The extension 140 projects in the direction of actuator recession and therefore, like the means previously described, operates to delay the return of the actuator 86 to its operational path until the measuring wheel 76 has moved through a predetermined angular range materially greater than would be the case were the mechanism without the advantages of the invention.

*Summary*

Throughout all of the forms of the invention illustrated here is the thread of means for delaying return of the actuator to a starting position so as to prevent multiple tripping. The foregoing are a few examples of the application of the invention. Others will undoubtedly suggest themselves to those versed in the art, as will deviations from those disclosed, all of which may be achieved without departing from the spirit and scope of the invention.

What is claimed is:

1. In a baler having a bale case, means for compacting and accumulating successive charges of material in the bale case, and periodically energizable and de-energizable tying means for performing periodic tying operations on successive accumulations of material, the improvement, comprising: an operator biased to an idle position incurring de-energizing of the tying means and movable to a trip position for energizing the tying means; a measuring device rotatable forwardly through a normal cycle, as the material is accumulated and compacted, and subject to reverse rotation in relatively small angular increments incident to expansion of the material between charges; an actuator pivotally connected to the measuring device eccentrically to the axis of rotation of said device for motion as a pitman to recede from the operator as the measuring device begins its cycle and then to approach the operator as said device completes its cycle, said actuator being biased toward and guided along a path leading to engagement with the operator for moving the operator, in the final angular increment of said device cycle, to the operator trip position to thereby energize the tying means; control means operative incident to energizing of the tying means and including a cam for temporarily displacing the actuator from said path and from engagement with the tripped operator to enable biased return of the operator to its idle position to automatically de-energize the tying means upon completion of its tying operation, said operator, in returning to its idle position relative to the offset actuator, being normally arranged to overrun said actuator to thereby create a condition of operator-actuator misalinement lengthwise of the actuator path, subsequent forward or reverse rotation of the measuring device through a relatively small angular increment being sufficient to cause enough recession of the actuator to clear said cam thereby tending to permit correction of said misalinement; and means additional to the control means for retaining the offset relation of the actuator after clearing said cam to postpone correction of said misalinement, whereby to prevent re-engagement of the operator and actuator incident to movement of the measuring device in relatively small angular increments, said additional means including a support holding the offset actuator in its displaced relation to the operator until recession of the actuator by the measuring device materially exceeds the amount of actuator recession required to clear said cam, said actuator being subsequently releasable from the holding influence of said support; whereby return of the actuator to said path is postponed until the measuring device is well into its next normal cycle.

2. The invention defined in claim 1, in which: the cam is driven to be respectively rotatable and stationary incident to energizing and de-energizing of the tying means; and the additional means support is a second cam operative subsequent to the first mentioned cam and effective upon de-energizing of the tying means to hold the actuator in displaced relation until the actuator recedes in said excess amount.

3. The invention defined in claim 1, in which: the additional means support includes a member driven in conjunction with the energizing and operation of the tying means and positioned upon de-energizing of the tying means as a stationary support of greater length in the direction of actuator recession than the amount of actuator recession required to clear said cam.

4. The invention defined in claim 1, in which: the additional means support for the displaced actuator comprises a releasable lock member operating as a pawl between the measuring device and the actuator, said pawl being arranged to be overrun as the measuring device drives the actuator but effective as a lock to support the offset actuator, said lock member being releasable when the actuator recedes in said excess amount.

5. The invention defined in claim 4, in which: the actuator and the measuring device are interconnected by a crank arm rotatable by the measuring device and having a crank pin pivoting the actuator to the arm; and the lock member is pivoted to the arm for biased swinging into one-way engagement with the actuator.

6. The invention defined in claim 1, in which: the support for the displaced actuator comprises an extension projecting from and beyond the operator in a normal position extending in the direction of actuator recession and offset to the actuator path so as to be normally free from interference with engagement of the actuator with the operator; as the measuring device completes its cycle; means connecting the extension to the operator for relative movement to be shifted by displacement of the actuator and for return to said normal position prior to return of the actuator so as to support the actuator in said offset relation until the actuator recedes sufficiently to be released from said extension.

7. The invention defined in claim 6, in which: the extension is a lug pivoted to the operator and spring-pressed to its normal position.

8. The invention defined in claim 1, in which: the support for the displaced actuator comprises an extension projecting from and beyond the operator in a normal position extending in the direction of actuator recession and offset to the approach path of the actuator so as to be clear of actuator-operator engagement as the measuring device completes its cycle; means fixedly mounting the extension on the operator; and one way collapsible means on the operator-proximate end of the actuator having a normal position effective to afford straight-line action of the actuator in shifting the operator, said collapsible means being releasable upon displacement of the actuator so as to clear the extension and said collapsible means being returnable to its normal position when past the extension so as to provide a stop preventing return of the actuator to its path until the measuring device rotates well into its normal cycle as aforesaid to clear said collapsible means from the extension.

9. The invention defined in claim 8, in which: the collapsible means comprises an end member pivoted to the actuator and spring-pressed to its normal position, and stops limiting said return to normal and preventing collapse counter to the direction of actuator displacement.

10. The invention defined in claim 1, in which: the additional means support comprises an extension on the operator-proximate end of the actuator and collapsible lengthwise of said actuator; means biasing the extension in the direction of approach of the actuator so that, upon contact of the actuator with the operator, the extension collapses; stop means limiting collapse of the extension to enable the actuator to move the operator to its trip position, said extension-biasing means projecting the extension after the operator is cleared so that said extension prevents return of the actuator to its path until the measuring device rotates will into its normal cycle as aforesaid to clear the extension from the operator; and second stop means limiting projection of the extension.

11. The invention defined in claim 10, in which: the extension is slidably carried by the actuator, and the extension-biasing means is lighter than the bias of the operator to its idle position.

References Cited in the file of this patent

UNITED STATES PATENTS 2,405,688　　　Crumb _____ Aug. 13, 1946

FOREIGN PATENTS 26,902　　　Denmark _____ Nov. 15, 1920